3,121,101
16-ACETYL-3,20-DIKETOSTEROIDS AND PROCESS FOR THEIR MANUFACTURE
Erhard Daase, Kelkheim, Taunus, and Werner Fritsch, Neuenhain, Taunus, Germany, assignors to Farbwerke Hoechst Aktiengesellschaft vormals Meister Lucius & Brüning, Frankfurt am Main, Germany, a corporation of Germany
No Drawing. Filed Apr. 24, 1961, Ser. No. 104,821
Claims priority, application Germany Apr. 27, 1960
3 Claims. (Cl. 260—397.3)

The present invention relates to novel 16β-acetyl-3,20-diketosteroids of the pregnene, pregnane, or allopregnane series.

The novel products are distinguished by valuable therapeutic properties, for example by their hormone effect, or they represent intermediate products for the manufacture of therapeutically active compounds.

The present invention relates also to a process for the manufacture of these 16β-acetyl-3,20-diketosteroids, which comprises treating a 3-acyloxy-16-diazoketone of the 20-keto-pregnene, 20-keto-pregnane, or 20-keto-allopregnane series with hydrogen halide, reducing the 16-halogenoacetyl-3-acyloxy-steroids obtained or the 16-halogenoacetyl-3β-ol-steroids produced by acid saponification in 3-position, splitting off by acid saponification the 3-acyl groups and oxidizing by the Oppenauer method the reaction products obtained.

16-iodoacetyl-3-acyloxy-steroids as products of the first reaction stage can also be produced by reacting corresponding 16-chloroacetyl-3-acyloxy-steroids with sodium iodide in acetone.

When 3β-acyloxy-Δ⁵-pregnene-20-one-16-diazoketone is used as starting material the reaction takes place, for example, according to the following scheme:

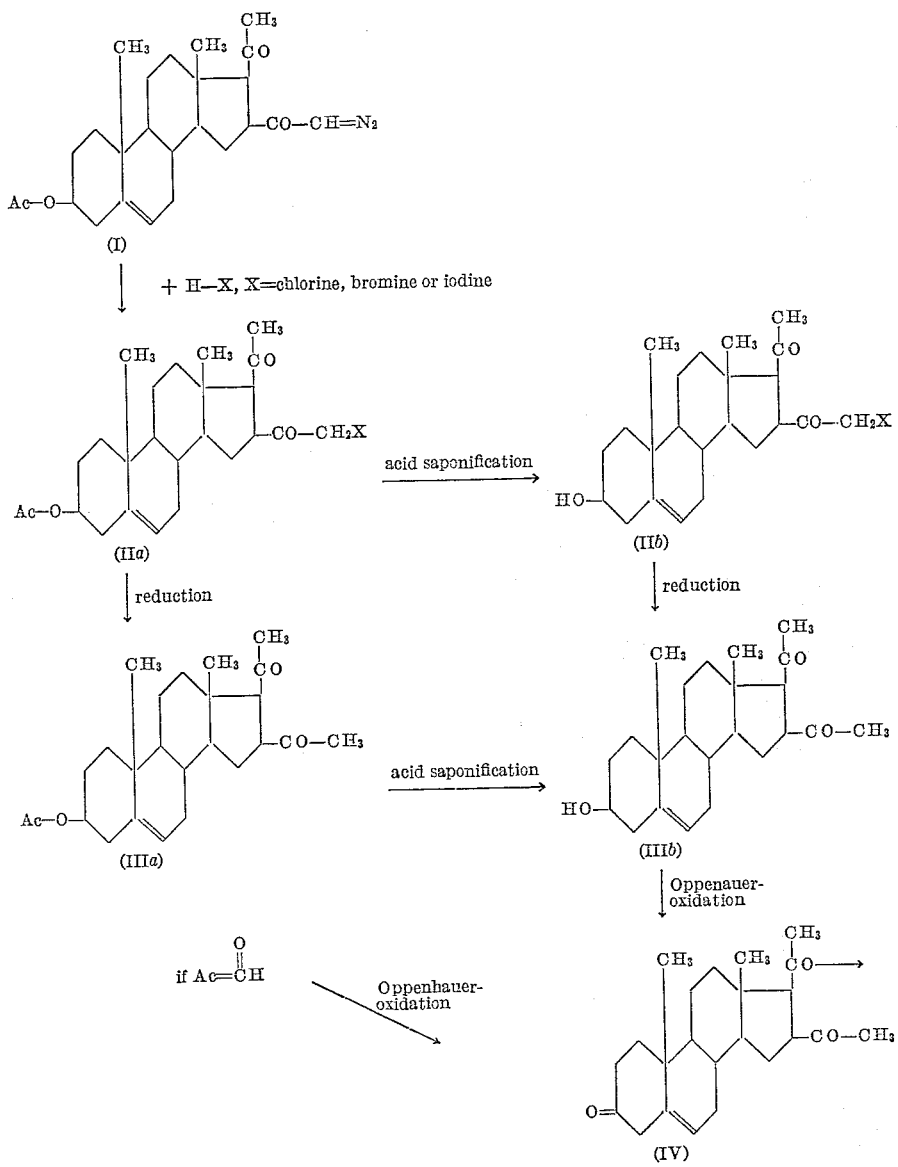

As starting materials for the process of the invention there can be used 3-acyloxy-Δ⁵-pregnene-20-one-16-diazoketones, 3-acyloxy-Δ¹,⁴-pregnadiene-20-one-16-diazoketones and the corresponding steroids of the pregnane or allopregnane series. The starting materials are advantageously prepared by reacting the corresponding 3-acyloxy-20-one-16-carboxylic acid chlorides with diazomethane. As acyl radicals there are especially suitable acyl groups of low molecular weight, for example the formyl, acetyl and propionyl radicals.

The reaction in the first stage of the 16β-diazoketones (I) with hydrohalic acids to obtain the corresponding 16β-halogenoacetyl-3-acyloxy-compounds (IIa) is suitably carried out at room temperature in an inert solvent such as acetonitrile, diethyl ether, dioxane, or benzene and preferably in a mixture of diethyl ether and benzene. As hydrohalic acids there can be used hydrochloric acid, hydrobromic acid or hydroiodic acid. It is of advantage to add a solution of the hydrohalic acid in ether to the solution of the diazoketone. In general the reaction takes 30 to 60 minutes and it is terminated when the evolution of nitrogen has ceased.

The 16β-halogenoacetyl-20-ketosteroids obtained as final products in the first reaction stage are transformed in the second reaction stage into the corresponding 16β-acetyl derivatives by reducing them in 16β-position. For the reduction of the halogenoacetyl group there can be used as starting material either the corresponding 16β-halogenoacetyl-3-acyloxy-steroids (IIa) or the corresponding compounds having a free hydroxy group in 3-position (IIb). The latter compounds can be prepared in simple manner from 16-halogenoacetyl-3-acyloxy compounds by saponification of the 3-acyloxy group. The saponification is advantageously carried out in an acid medium with the use of aqueous hydrochloric acid or of p-toluene-sulfonic acid in ethanol at the boiling temperature and, in general, it is terminated after 30 to 120 minutes. The 16-halogenoacetyl group can be reduced with zinc/glacial acetic acid, sodium bisulfite, sodium thiosulfate, or by means of a catalyst. In case a 16-chloroacetyl- or 16-bromoacetyl-steroid is used it is of advantage first to exchange the chlorine or the bromine atom, respectively, for an iodine atom by a treatment with sodium iodide in acetone. The 16-iodoacetyl compound obtained is then suitably reacted with zinc/glacial acetic acid at a temperature in the range from 0 to +50° C.

The 16β-acetyl-3β-acyloxy compounds or the 16β-acetyl-3β-hydroxy compounds obtained in the reduction are subjected in a further reaction stage to the Oppenauer oxidation. It is necessary to split off by acid saponification an acetoxy- or propionoxy group that may be present in 3-position, before the Oppenauer oxidation is carried out. The saponification is carried out, as already mentioned above, in an acid medium with the use of aqueous hydrochloric acid or with p-toluene-sulfonic acid in ethanol. For the oxidation according to Oppenauer, the compounds are suitably reacted in an inert solvent, for example in benzene, xylene or preferably in toluene, with an aluminum alcoholate, for example aluminum isopropylate or aluminum butylate, in the presence of ketones such as acetone or cyclohexanone at the boiling temperature of the solvent used in each case. In general, the Oppenauer oxidation takes place very rapidly and is complete after about 1 hour when small quantities are used.

The preceding acid saponification in 3-position can be dispensed with if the compounds contain in 3-position a formoxy group, since 3-formoxy-steroids of this kind can be directly subjected to the reaction according to Oppenauer.

In case in the last stage 16β-acetyl-Δ⁴-pregnene-3,20-diones are obtained as final products, these can be transformed in usual manner into the corresponding pregnane or allopregnane derivatives by hydrogenation of the Δ⁴-double bond. This reaction is suitably carried out in a manner such that the 16β-acetyl-Δ⁴-pregnene-3,20-dione is hydrogenated at room temperature in alcoholic solution, for example in methanolic or ethanolic solution, in the presence of a palladium catalyst precipitated on zinc carbonate, while mechanically stirring for a prolonged period of time, until the calculated amount of hydrogen has been taken up.

The process of the invention is suitable for a great number of compounds, that is to say further substituents that may be present in the steroid nucleus, such as methyl groups in 2- and/or 6-position, halogen atoms, especially fluorine atoms in 6- or 9-position, hydroxy groups in 11- and/or 17-position or keto groups in 11-position do not disturb the course of the process.

The novel products obtained as final products of the Oppenauer oxidation possess themselves valuable therapeutic properties or they represent intermediate products for the manufacture of therapeutically interesting compounds. For example, the 16β-acetyl-3,20-diketo steroids of the pregnene series possess hormone effects, especially gestational effects and are, therefore, suitable for the treatment of menstrual disorders and habitual abortion. Besides, the compounds, in particular the 16β-acetyl-3,20-diketo steroids of the pregnane- or allopregnane series, exhibit sedative and/or narcotic properties.

The products of the invention can be administered as such or in the form of pharmaceutical preparations, for example as oily suspensions, as crystalline suspensions or in the form of solutions, capsules or tablets, either orally or parenterally. For the manufacture of the pharmaceutical preparations the usual carrier substances can be used which do not react with the compounds of the present invention, for example, water, bolus, starch, lactose, magnesium stearate, gelatine, talcum, tylose, vegetable oils, such as olive oil, peanut oil, castor oil, further cotton seed oil, gum, propylene glycol, polyethylene glycol, zinc oxide, titanium dioxide, and other customary carriers. The products of the present invention may be sterilized and/or may contain auxiliaries, such as stabilizers, buffer substances, wetting agents, emulsifiers or salts influencing the osmotic pressure. The galenic preparations are prepared according to the usual methods.

The following examples serve to illustrate the invention but they are not intended to limit it thereto.

EXAMPLE 1

*16β-Acetyl-Δ⁴-Pregnene-3,20-Dione*

($a_1$) 16β-CHLOROACETYL-Δ⁵-PREGNENE-3β-OL-20-ONE-3-FORMATE 10 grams 3β-formoxy-Δ⁵-pregnene-20-one-16-diazoketone were dissolved in 100 cc. benzene and 300 cc. ether. While mechanically stirring vigorously 30 cc. diethyl ether saturated with hydrogen chloride were dropped in at room temperature. The reaction mixture was stirred for one hour at room temperature and the solvent was distilled off under reduced pressure. The crystalline residue was triturated with a mixture of ether and petroleum ether (1:1) and filtered off with suction. 8.3 grams 16β-chloroacetyl-Δ⁵-pregnene-3β-ol-20-one-3-formate were obtained having a melting point of 142° C.

($a_2$) 16β-IODOACETYL-Δ⁵-PREGNENE-3β-OL-20-ONE-3-FORMATE 7 grams 16β-chloroacetyl-Δ⁵-pregnene-3β-ol-20-one-3-formate were dissolved in 100 cc. acetone and a solution of 10 grams sodium iodide in 70 cc. acetone was added. After having boiled for 30 minutes the sodium chloride was separated by filtration, the filtrate was concentrated by 50% by evaporation under reduced pressure and the residue was poured into 100 cc. cold water. After having filtered off with suction 6.6 grams 16β-iodoacetyl-Δ⁵-pregnene-3β-ol-20-one-3-formate were obtained having a melting point of 138° C. (Kofler-heater).

($a_3$) 16β-IODOACETYL-Δ⁵-PREGNENE-3β-OL-20-ONE 1.8 grams 16β-chloroacetyl-Δ⁵-pregnene-3β-ol-20-one-3-formate were dissolved in 40 cc. ethanol and heated for 90 minutes to boil under reflux with 4 cc. concentrated hydrochloric acid. The ethanol was then evaporated under reduced pressure and the residue was dried for one hour under reduced pressure at 40° C. The residue was dissolved in 40 cc. ethanol and a solution of 4 grams sodium iodide in 20 cc. acetone was added. After having heated under reflux for 30 minutes the sodium chloride was filtered off and the solution was concentrated by 50% under reduced pressure. The acetone solution was poured into 100 cc. cold water, whereby the 16β-iodoacetyl-$\Delta^5$-pregnene-3β-ol-20-one separated in the form of crystals. 1.6 grams of product were obtained having a melting point of 100° C. (Kofler-heater).

($a_4$) 16β-IODOACETYL-$\Delta^5$-PREGNENE-3β-OL-20-ONE-3-FORMATE 3 grams 3β-formoxy-$\Delta^5$-pregnene-20-one-16β-diazoketone were dissolved in 50 cc. acetonitrile and over the solution was passed at room temperature for 5 minutes a weak current of hydrogen iodide, while stirring vigorously. A strong evolution of nitrogen set in at once and was terminated after 20 minutes. The red brown solution was concentrated under reduced pressure and the 16β-iodoacetyl-$\Delta^5$-pregnene-3β-ol-20-one-3-formate was recrystallized from a mixture of ether and petroleum ether. 2.1 grams of the compound were obtained having a melting point of 136–138° C. Together with the substance obtained as described in Example 1($a_2$) the compound did not give a melting point depression.

The 3β-formoxy-$\Delta^5$-pregnene-20-one-16β-diazoketone used as starting product was prepared, for example, as follows:

90 cc. thionyl chloride were added to a solution of 8.9 grams 3β-formoxy-$\Delta^5$-pregnene-20-one-16β-carboxylic acid in 90 cc. benzene and the whole was heated under reflux for one hour at 80° C. The reaction mixture was then evaporated to dryness under reduced pressure and at a bath temperature of 30° C. The crystalline residue was triturated with little petroleum ether and filtered off with suction. 7.9 grams 3β-formoxy-$\Delta^5$-pregnene-20-one-16β-carboxylic acid chloride were obtained having a melting point of about 160° C.

A solution of 7.9 grams 3β-formoxy-$\Delta^5$-pregnene-20-one-16β-carboxylic acid chloride in 150 cc. benzene and 100 cc. ether was added to an ethereal solution of diazomethane (made from 35 grams nitroso-methylurea). After having been stirred for 150 minutes at 0° C. the reaction mixture was evaporated to dryness under reduced pressure. The crystalline residue was triturated with little ether and filtered off with suction. 7.7 grams of 3β-formoxy-$\Delta^5$-pregnene-20-one-16β-diazoketone were obtained, having a melting point of about 158° C.

($b_1$) 16β-ACETYL-$\Delta^5$-PREGNENE-3β-OL-20-ONE-3-FORMATE 15 grams of zinc dust were added, while vigorously stirring at room temperature, to a solution of 10 grams 16β-iodoacetyl-$\Delta^5$-pregnene-3β-ol-20-one-3-formate in 200 cc. glacial acetic acid and the whole was stirred for 45 minutes. The zinc dust was then filtered off, the filtrate was washed with glacial acetic acid and then stirred into 100 cc. water. After filtration 8.8 grams 16β-acetyl-$\Delta^5$-pregnene-3β-ol-20-one-3-formate were obtained having a melting point of 185° C.

($b_2$) 16β-ACETYL-$\Delta^5$-PREGNENE-3β-OL-20-ONE 1 gram 16β-acetyl-$\Delta^5$-pregnene-3β-ol-20-one-3-formate was dissolved in 100 cc. ethanol, 8 cc. concentrated hydrochloric acid and 5 cc. water were added and the whole was heated for 1.5 hours under reflux. After having been cooled the reaction mixture was diluted with 300 cc. water, and the crystalline precipitate was filtered off with suction. 0.8 gram 16β-acetyl-$\Delta^5$-pregnene-3β-ol-20-one was obtained having a melting point of 155–158° C. After having been recrystallized from acetone the product had a melting point of 161° C.

($b_3$) 0.5 gram 16β-acetyl-$\Delta^5$-pregnene-3β-ol-20-one-3-formate were dissolved in 50 cc. ethanol and a solution of 1 gram p-toluene-sulfonic acid in 5 cc. water was added. After having boiled under reflux for 90 minutes half of the alcohol was evaporated and the reaction product was diluted with water, whereby 0.35 gram 16β-acetyl-$\Delta^5$-pregnene-3β-ol-one crystallized out, having a melting point of 160° C.

($b_4$) 16β-ACETYL-$\Delta^5$-PREGNANE-3β-OL-20-ONE 1.6 grams of 16β-iodoacetyl-$\Delta^5$-pregnene-3β-ol-20-one were dissolved in 80 cc. glacial acetic acid and, while vigorously stirring at room temperature, 2 grams of zinc dust were added. The reaction mixture was stirred for one hour at room temperature, the zinc dust was eliminated by suction filtration and the filtrate was stirred into 300 cc. cold water. 1.1 grams 16β-acetyl-$\Delta^5$-pregnene-3β-ol-20-one were obtained having a melting point of 162° C. A sample of the substance together with the compound obtained as described in Example 1($b_2$) and 1($b_3$) did not show a melting point depression.

(c) 16β-ACETYL-$\Delta^4$-PREGNENE-3,20-DIONE FROM 16β-ACETYL-$\Delta^5$-PREGNENE-3β-OL-20-ONE-3-FORMATE (α) 6 grams 16β-acetyl-$\Delta^5$-pregnene-3β-ol-20-one-3-formate were dissolved in 200 cc. toluene and 60 cc. cyclohexanone. 40 cc. of said solution were distilled off and 15 grams aluminum isopropylate dissolved an 50 cc. toluene were added. The reaction mixture was heated at the boil under reflux for one hour and the limpid solution was then subjected to a steam distillation until the distillate passed in the limpid state. The aqueous suspension was evaporated to dryness under reduced pressure and the solid residue was extracted six times, each time with 200 cc. methylene chloride. After having evaporated the methylene chloride a residue was obtained which was recrystallized from methanol. 4.7 grams of 16β-acetyl-$\Delta^4$-pregnene-3,20-dione were obtained. The melting point of the product was 168° C. before recrystallization from methanol and 172° C. after.

(β) *16β-acetyl-$\Delta^4$-pregnene-3,20-dione from 16β-acetyl-$\Delta^5$-pregnene-3β-ol-20-one.*—From a solution of 3 grams 16β-acetyl-$\Delta^5$-pregnene-3β-ol-20-one in 150 cc. toluene and 30 cc. cyclohexanone, 30 cc. were distilled off in order to remove the moisture. Then 6 grams aluminum isopropylate in 20 cc. toluene were added and the reaction mixture was heated for one hour under reflux. The solution was subsequently subjected to a steam distillation until the distillate passed over in the limpid state. After the evaporation of methylene chloride the residue was recrystallized from methanol. 2.52 grams of 16β-acetyl-$\Delta^4$-pregnene-3,20-dione were obtained having a melting point of 168° C.

EXAMPLE 2

*16β-Acetyl-5α-Pregnane-3,20-Dione*

5 grams 3β-formoxy-5α-pregnane-20-one-16β-diazoketone were dissolved in 80 cc. benzene and 100 cc. diethyl ether and, while mechanically stirring at room temperature, 20 cc. diethyl ether saturated with hydrogen chloride were added. As soon as the evolution of nitrogen had ceased the solution was concentrated under reduced pressure. The 16β-chloroacetyl-5α-pregnane-3β-ol-20-one-3-formate obtained in the form of a crystalline residue was dissolved in 50 cc. acetone and a solution of 5 grams sodium iodide in 40 cc. acetone was added. After having been boiled for 30 minutes the solution was filtered off from the sodium chloride and the acetone was evaporated under reduced pressure. The yellow, oily residue was crystallized by the addition of water.

The crude 16β-iodoacetyl-5α-pregnane-3β-ol-20-one-3-formate was dissolved in 100 cc. glacial acetic acid, 5 grams of zinc dust were added while vigorously stirring and the whole was stirred for 45 minutes at room temperature. The reaction mixture was then filtered, the filtrate was stirred into 500 cc. water and the colorless precipitate formed was filtered off with suction. The 16β-acetyl-derivative thus obtained was dissolved in 100 cc. toluene and 30 cc. of cyclohexanone, a solution of 8 grams aluminum isopropylate in 20 cc. toluene was added and the whole was heated at the boil for one hour. The reaction mixture was then subjected to a steam distillation until the distillate passed over in the limpid state. The aqueous suspension was concentrated under reduced pressure and the residue was extracted with acetone. After the evaporation of the acetone a residue was obtained which crystallized in ethanol. By recrystallization from a mixture of ethanol and diethyl ether 2.4 grams of 16β-acetyl-5α-pregnane-3,20-dione were obtained having a melting point of 148° C.

We claim:
1. A compound selected from the group consisting of 16β-acetyl-Δ$^4$-pregnene-3,20-dione and 16β-acetyl-5α-pregnane-3,20-dione.
2. 16β-acetyl-Δ$^4$-pregnene-3,20-dione.
3. 16β-acetyl-5α-pregnane-3,20-dione.

No references cited.